US009256850B2

(12) United States Patent
Harley et al.

(10) Patent No.: US 9,256,850 B2
(45) Date of Patent: Feb. 9, 2016

(54) ORPHAN TOKEN MANAGEMENT DURING IN-FLIGHT PROCESS SYSTEM MIGRATION

(71) Applicant: International Business Machines Corporation, Armonk, NY (US)

(72) Inventors: Gregory D. Harley, Manor, TX (US); Sanjay F. Kottaram, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 13/682,905

(22) Filed: Nov. 21, 2012

(65) Prior Publication Data

US 2014/0143765 A1    May 22, 2014

(51) Int. Cl.
*G06F 9/44* (2006.01)
*G06Q 10/06* (2012.01)
*G06F 9/445* (2006.01)

(52) U.S. Cl.
CPC ............... *G06Q 10/067* (2013.01); *G06F 8/65* (2013.01)

(58) Field of Classification Search
CPC ............... G06F 8/65; G06F 8/67; G06F 8/68
USPC ........................................... 717/168
See application file for complete search history.

(56) References Cited

U.S. PATENT DOCUMENTS

| 7,406,424 | B2 | 7/2008 | Cheniyil et al. | |
|---|---|---|---|---|
| 2002/0052771 | A1* | 5/2002 | Bacon et al. | 705/8 |
| 2006/0095276 | A1* | 5/2006 | Axelrod et al. | 705/1 |
| 2008/0059387 | A1 | 3/2008 | Vaidhyanathan et al. | |
| 2008/0115123 | A1 | 5/2008 | Kelly et al. | |
| 2008/0196027 | A1* | 8/2008 | Hohmann et al. | 718/100 |
| 2009/0064130 | A1* | 3/2009 | Davis et al. | 717/173 |
| 2009/0125899 | A1 | 5/2009 | Unfried | |
| 2009/0327199 | A1 | 12/2009 | Weber et al. | |
| 2010/0121668 | A1* | 5/2010 | Hohmann | 705/8 |
| 2010/0122251 | A1 | 5/2010 | Hohmann | |
| 2011/0029594 | A1 | 2/2011 | Rees et al. | |
| 2011/0154336 | A1 | 6/2011 | Balko | |
| 2011/0276968 | A1 | 11/2011 | Kand et al. | |

OTHER PUBLICATIONS

Leemburg, B, "A declarative meta modeling approach to define process migration constraints", Masters Thesis, University of Groningen, Aug. 2011, pp. 1-82.*

(Continued)

*Primary Examiner* — Li B Zhen
*Assistant Examiner* — Bradford Wheaton
(74) *Attorney, Agent, or Firm* — Richard A. Wilhelm; Thomas E. Tyson

(57) ABSTRACT

A method, apparatus, and computer-readable storage media for managing orphan tokens in a business process system. The method may include a first business process system template being compared by computer to a second business process system template. The method may include predicting by computer at least one predicted orphan token that would be orphaned if the business process system is migrated to the second business process system template from the first business process system template. The method may include further generating by computer an orphan token policy file to manage orphan tokens, and modifying a migration file using the orphan token policy file.

11 Claims, 4 Drawing Sheets

(56) References Cited

OTHER PUBLICATIONS

Leemburg, B., "A declarative meta modeling approach to define process migration constraints", Masters Thesis, University of Groningen, Aug. 24, 2011, pp. 1-82.

Zentner, C., "Dynamic Business Processes: Applying model changes to in-flight processes in V7", Impact 2010, May 2-7, 2010, Las Vegas, NV, © IBM Corporation 2009.

* cited by examiner

ORPHAN TOKEN MANAGEMENT DURING IN-FLIGHT PROCESS SYSTEM MIGRATION

TECHNICAL FIELD

Embodiments described herein generally relate to process system migration, and more specifically to orphan tokens created in process system migration.

BACKGROUND

Modern computer systems often use software to organize and monitor business processes. Often software is updated to correct errors, add features, or improve user interface. Software used for organization and monitoring of business processes may also be upgraded or updated to account for changes in law, business practices, organizational structures, and business policies. The updating of such software is often known as a migration, as information from one version is transferred or used in the next.

SUMMARY

In one embodiment, a method is provided for managing orphan tokens in a business process system. The method may include a first business process system template being compared by computer to a second business process system template. The method may include predicting by computer at least one token that would be orphaned if the business process system is migrated to the second business process system template from the first business process system template. The method may include further generating by computer an orphan token policy file to manage orphan tokens, and modifying a migration file using the orphan token policy file.

In another embodiment, a computer-readable storage media is provided for managing orphan tokens in a business process system. The method may include a first business process system template being compared by computer to a second business process system template. The method may include predicting by computer at least one token that would be orphaned if the business process system is migrated to the second business process system template from the first business process system template. The method may include further generating by computer an orphan token policy file to manage orphan tokens, and modifying a migration file using the orphan token policy file.

Yet another embodiment is directed to an apparatus for managing orphan tokens in a business process system.

BRIEF DESCRIPTION OF THE DRAWINGS

Embodiments are illustrated by way of example, and not by way of limitation, in the figures of the accompanying drawings in which like reference numerals refer to similar elements or steps.

DETAILED DESCRIPTION

Figure 1:
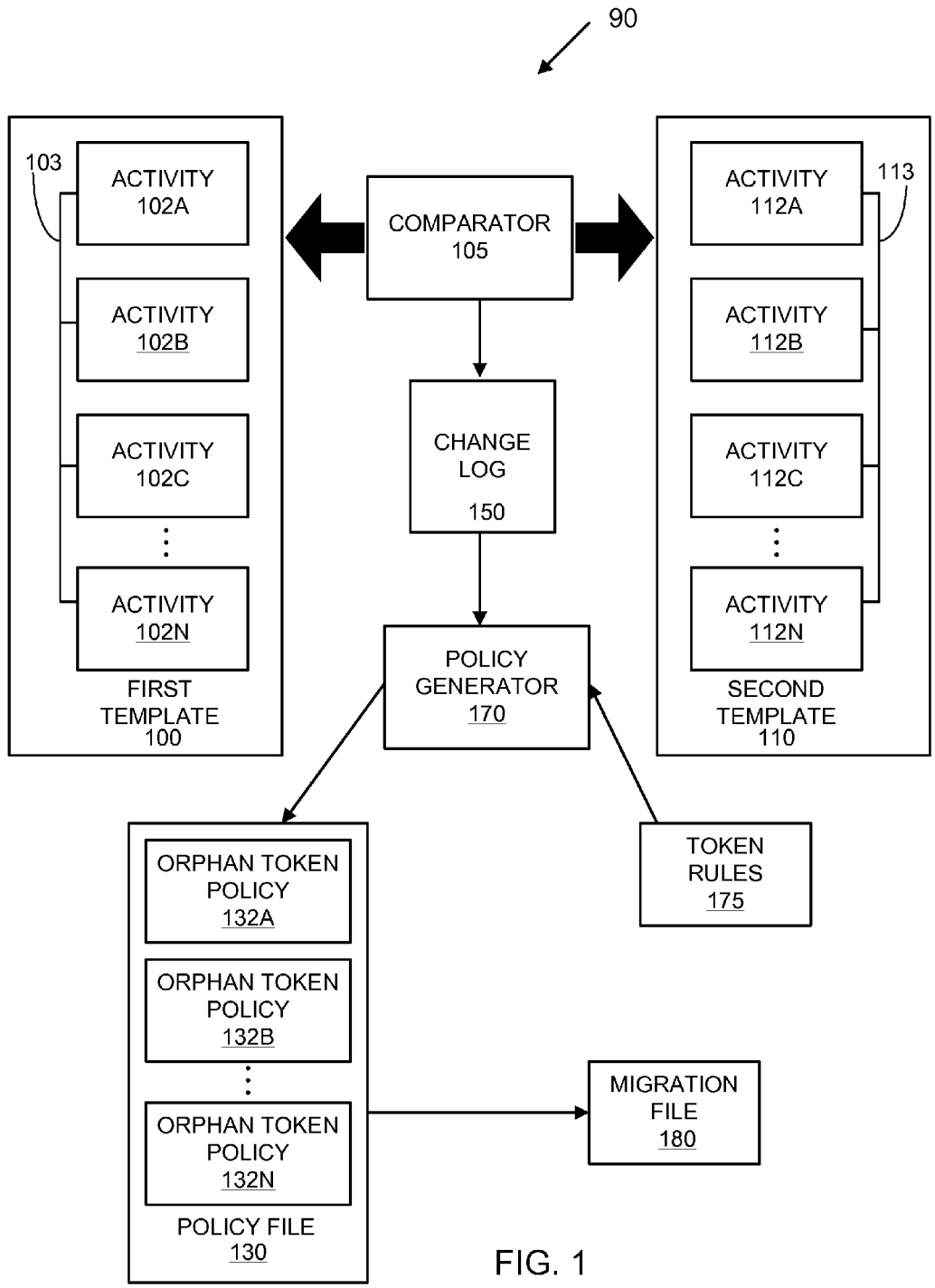
FIG. 1 is a pictorial illustration of a process for creating an orphan token policy file for process system migration, in accordance with an embodiment of the invention.

A business process system generally refers to software used for organization and monitoring of business processes, and an example of which is Business Process Manager (BPM) produced by IBM. The business process system may be generated by computer and may model a particular business process. The business process system may be used to manage activities within a business such as finance, engineering projects, loan application processing, or marketing activities and larger versions of such software tools and suites may be used to manage business or corporate wide activities. Business process system software, such as the previously mentioned BPM, may use Business Process Model and Notation (BPMN) which may use a graphical representation for specifying business process in a business process model or Business Process diagram (BPD). The use of such modeling and notation is to improve the use and support of the business process system software by making it intuitive to both the technical and business users. These models and notations may consist of diagrams constructed from a set of graphical elements which may provide all users with a consistent and visible understanding what may occur in the business process system.

Business process system migration may occur whenever business process system software is updated, revised, or modified. When a business process system migration occurs, instances within, attached to, or using the business process system may also need to be migrated. An instance may be an entire workflow of a transaction, or single project, in the business process system. For example, the instance may be the flow through the business process system of a single loan request, engineering project, or marketing campaign. A single instance may take days, weeks, months, or even years to completely pass through the business process system, and may require thousands of steps, forms, and data entries during that time. For example, it may take several months for a loan application to pass from application acceptance to approval. The business process system migration may involve the updating of not just the application software used but also the electronic forms, tables, and data stored for each instance. During business process system migrations, all currently active instances within the business process system may be migrated.

The migration of a business process system may be accomplished using a migration file. The migration file may be used convert the business process system from a first business process system template to a second business process system template. In various embodiments, the migration file may convert the instances that use, are connected to, or are within the business process system as part of the migration. In one embodiment, the migration file may be run on a computer system or network that contains the business process system. In another embodiment, the migration file may use dedicated hardware or software that may be used to migrate the business process system. In another embodiment, the migration file may be built into or part of the business process system. The migration file may contain data, instructions, programming, rules or other elements that may be use to migrate a business process system.

A token is generated and may be updated by the business process system to store activity data regarding each instance of a use of the particular business process. The token may contain an electronic marker of where the instance is in the business process system. The token may also include information on the progress of activities and data for the instance. For example, the token may include a checklist of all data entries for the process instances. The checklist may be used to confirm that the instances and token may progress through the business process system. An orphan token is a token with an incomplete or unfulfilled piece of data for the token based upon the instance location in the business process system. An orphan token is unable to advance through the new business process system. Orphan tokens may require time consuming work during or after the instance process migration to repair so that the instance may progress through the new business process system.

In one example, a bank using BPM software to manage loans decides to change the form used for loans in the business process system. The original form and workflow specified within the current business process system may require the application have the approval of a loan manager and the token may record the approval. The new form and workflow process removed the need for the loan manager to approve the application. In the new process a VP instead of the loan manager must approve the application per the new business process, a system and the token may need to record the activity. In the example, an instance for a loan may be in the current business process system when a migration occurs. If the instance, and the associated token, has already passed the activity where the approval, previously required by the loan manager, is completed at the time of the migration, the system may now have an orphan token in the data representing the now needed VP approval. The token may now show that the VP approval is incomplete and may create errors in the system since it may be irresolvable or illogical to the new business process system. The new business process system may have no way to ask for the approval at the current activity level, and the new business process system may not be able to move the instance forward with the token showing as an incomplete data point, thus resulting in an error that may require time and labor to resolve.

A business process may be defined by a template. The template may contain all activities, order of such activities, data, organization, forms, links, and workflows that may be used by the business process system for any instance that is entered into it. In the templates, activities may be a group of data entries, computations, or decisions that are combined. Links are the path or workflow connecting the activities. Templates may contain information on tokens, what they record, and what they must show for instances to progress through the business process system. Changes in business process systems may result in changes in the template used for the business process system, thus a migration of a business process system may include the first business process system changing from a first business process system template (herein after referred to as a first template) to a second business process system template (herein after referred to as a second template) for the new second business process. In accordance with an embodiment of the present invention, the first and second templates may be compared by a computer so that tokens that may be orphaned by a migration may be predicted. Changes of both activities and links between activities can be logged and compared for changes that may create orphan tokens in order to generate an orphan token policy file. The orphan token policy file generated may be used in the migration file used during the business process system migration to manage orphan tokens created during the migration thus preventing time consuming and costly delays caused by orphan tokens.

FIG. 1 is a pictorial illustration of a process 90 for creating an orphan token policy file for business process system migration. As shown in FIG. 1, a first business process system template 100 (herein after referred to as first template) may be a template of the current business process system. The first template may include the different activities 102A, 102B, 102C, 102N and the links 103 between these activities. The template, as previously mentioned, may include all possible activities and links between the activities for each type of instance possible in the business process system.

In one example, the template may contain the process for all loan activities, including the workflow of activities for instances of home loans, car loans, and small business loans. The template may also contain links between the activities. The links, as previously mentioned, may include jumps or connections between activities or the transfer of data from one activity to another. For example, if the first activity 102A is the form for applying for a loan, the link 103 may specify to proceed to activity 102B if the token indicates the application is for a home loan or instead to activity 102C if the token indicates the application is for a business loan. A second business process system template 110 (herein after referred to as second template) may include all possible activities and links for a revised business process system. The activities 112A, 112B, 112C, 112N and links 113 are shown for second template 110, and these activities may have equivalents within the activities of the first template 100. A comparator 105 may be used to compare the second template 110 and the first template 100 in order to predict activities, links, and information that the token may record or use that may be added, removed, or modified between the templates.

In one embodiment, a change log 150 of added, removed, or modified activities, links, and data requirements for 102A, 102B, 102C, 102N, 112A, 112B, 112C, 112N may be derived through a comparison of the links, activities, and data requirements for 102 and 112 in the first and second templates 100 and 110. In another embodiment, the change log 150 may include changes to the tokens and token requirements between activities and links for specific types of instances or workflows of the process. In various embodiments, the change log may contain a specific list of predicted orphan tokens. In other embodiments, the change log may contain and provide information on changes to the business process system so that predicted orphan tokens may be predicted by another element such as the policy generator 170.

The activities, links, tokens, or predicted orphan tokens in the change log 150 may be used by a policy generator 170 to create an orphan token policy file 130 with orphan token policies 132A, 132B, 132N (herein after collectively referred to as 132). In embodiments where the change log does not identify predicted orphan tokens, the policy generator 170 may perform the function of searching for predicted orphan tokens using information provided by the change log 150. Once the predicted orphan tokens are identified, either by the change log 150 or by the policy generator 170 the orphan token policy file 130 may be created by the policy generator 170. The orphan token policy file may be created by comparing the predicted orphan tokens to a set of token rules 175 for handling orphan token types.

In one embodiment, activities, links, or data in the process may have designations explaining their existence. The token may also use such designations internally for information it tracks or data it collects. When predicting how to apply the token rules 175 to the predicted orphan tokens in the creation of an orphan token policy file designations such as these may be used. An activity, link, or data that exists to comply with a law may be coded "L", whereas ones that are based on a quality control policy may be coded "Q1", "Q2", or "Q3" with the numerical value designating as organizational level of importance to the policy. In one example, the token rules 175 may be applied to predicted orphan tokens with an "L" designation due to a missing data point with an "L" designation. The rule may require that if a predicted orphan token has an "L" designation the instance is relocated to the earliest activity that the data point appears. This may allow the predicted orphan token to be corrected and the associated instance to progress in the changed business process system without error.

In one example, a law change that requires that approved loans be filed and assigned a number by a state is to be implemented in the business process system. The two templates 100 and 110 are compared and a change log 150 created. In the first template 100 this activity and the token of the state number did not exist. In the second template 110 the filing and number assignment by the state may occur in activity 112B. When the instance was migrated the loan, or instance, was at activity 102C, thus the migration file 180 may initially attempt to migrate the loan to equivalent activity 112C in the second template 110. The token post migration may include the number assignment within a checklist But the token has no record of the number assignment being completed and the second business process system may not allow for the recording of the action in activity 112C. The second business process system may not allow the instance to progress to a next activity without the number assignment being recorded in the token checklist This may result in an orphan token. The orphan token may designate this item on the checklist as L since it is a legal requirement. The orphan token policy file 130 created in the example may require that the instance be reset or relocated to activity 112B, or alternatively to 112A, to obtain the state number upon the detection of the orphan token with an L designation. When the orphan token policy file 130 is used to modify the migration file 180 the error may be corrected, and the time and labor required to traditionally repair the problem avoided.

In another example, the added activity may be a manager's approval that was coded as a Q3 in the checklist of the token. Q3 in this example may be a quality control policy of low importance. The token rules 175, applied through the policy generator 170, may state that Q3 items should be bypassed. The resulting token policy file may result in the missing item with a Q3 designation being filled in on the token checklist as complete. The change made according to the orphan token policy file may resolve the predicted orphan token during the migration and allow the instance to progress through the updated business process system without error.

Figure 2:
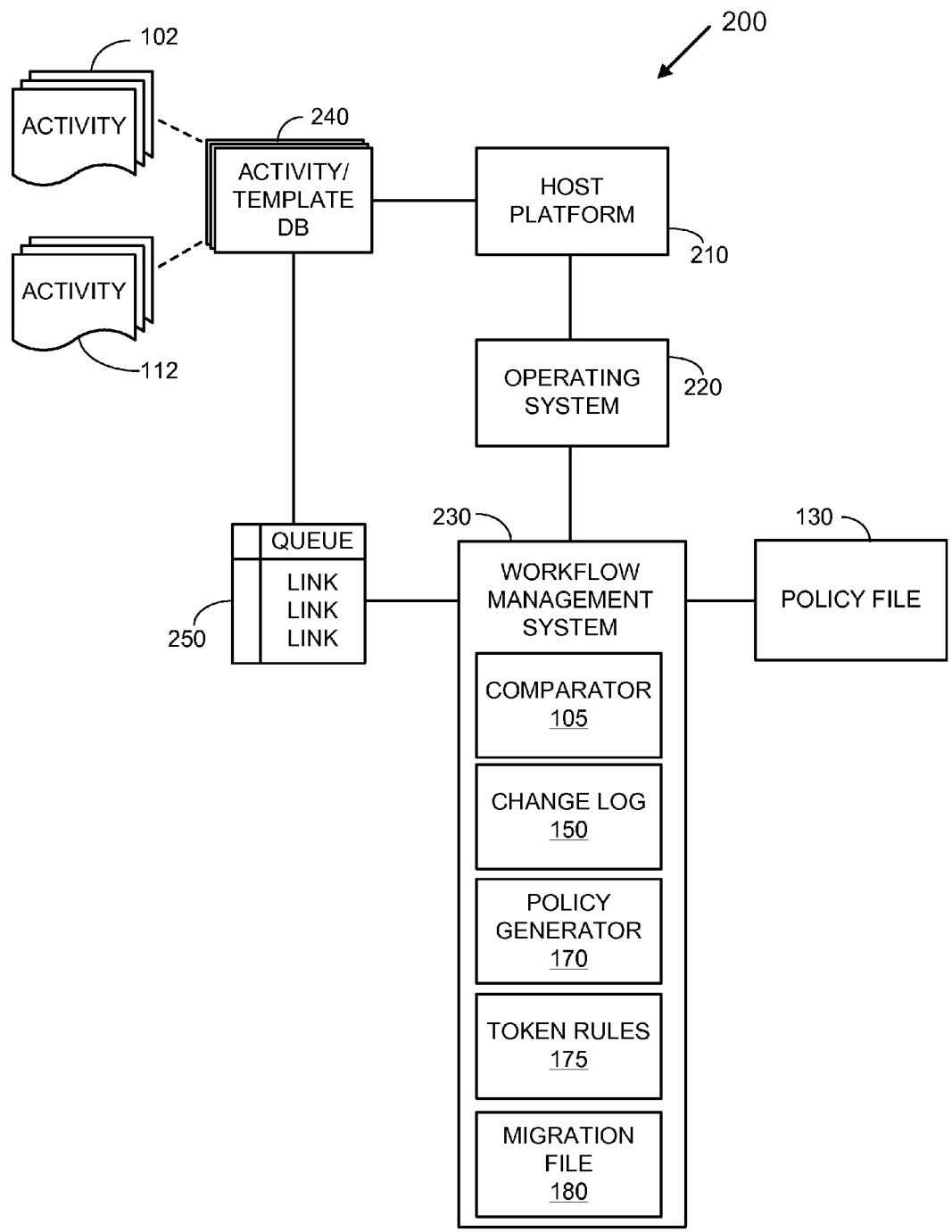
FIG. 2 is a schematic illustration of workflow editorial system configured for creating an orphan token policy file for process system migration, in accordance with an embodiment of the invention.

The process described in connection with FIG. 1 can be implemented within a workflow editorial processing system 200 shown in FIG. 2. FIG. 2 is a schematic illustration of a process workflow editorial system configured for creating an orphan token policy file for business process system migration. The system can include a host computing platform 210 executing an operating system 220. The host computing platform 210 may be, in one embodiment, the computer system 401, which is further described below. The operating system 220 in turn can support the operation of a workflow management system 230. For example, the workflow management system 230 may be or include a BPM process editing tool that may create, edit, store, and execute processes of the business process systems. The workflow management system may store the different activities 102 and 112 in activity and template database 240. Links between the different activities within 102 or 112 for an executing business process system can be placed in a queue 250 and ordered for execution in accordance with a workflow defined by a specified arrangement of the activities of the executing business process system set forth by the links. For example, the processing of a loan through both the old and new business process system as defined in respective templates 100 and 110. The process workflow editorial system 200 may include a process administration console.

An orphan token policy file 130 can be created, modified, and used by the workflow management system 230. The workflow management system 230 shown includes the comparator 105, change log 150, policy generator 170, and token rules 175 though in other embodiments these elements may be individual or combined in various forms to accomplish the required tasks. The workflow management system 230 may connect to, contain, or be independent of the migration file 180 used in the actual migration. The orphan token policy file 130 may include instructions or policies for managing orphan tokens, some examples are: supplying or modifying data to the orphan token from another activity or token, converting or modifying data entries within the orphan token to satisfy progression requirements, assigning the orphan token to another activity, deleting the orphan token, or suspending the execution of the business process system. Once created the orphan token policy file may be used to modify the migration file 180 actually used in the migration of the business process system.

In one embodiment, a new activity, per the second template 110, may require the approval of two managers at a fourth activity, where the first template 100 required the signature of a single manager at the fourth activity. The example migrated instance is currently at an eighth activity thus the second approval required may result in an orphan token. The modified migration file 180 may designate this second signature as a low priority item and may mark it as complete within the token to resolve the orphan token status due to the orphan token policy file. In another embodiment, the approval may be determined to be of high importance and the instance may be reset or relocated back to the fourth activity so that the second approval may be acquired.

Figure 3:
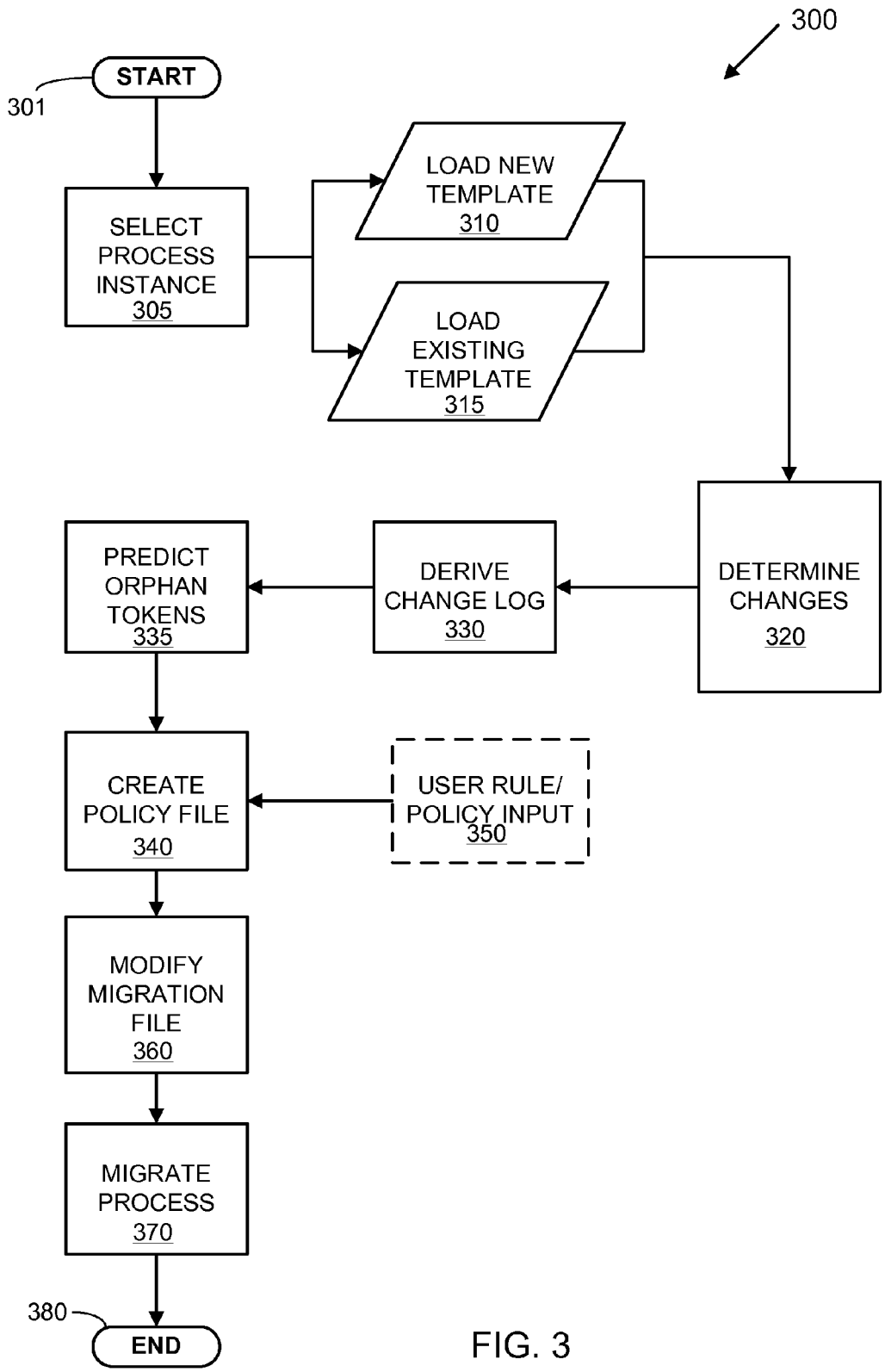
FIG. 3 is a flow chart illustrating the creation and use of orphan token policy file for process system migration, in accordance with an embodiment of the invention.

In yet further illustration of the orphan token policy file 130, FIG. 3 is a flow chart illustrating a method 300 for creation and use of orphan token policy file for business process system migration. The method 300 begins at block 301 and in block 305 an executing business process system may be selected for migration from the existing first template 100 to a new second template 110. As such, in block 310 and 315, both the first template 100 and the second template 110 are respectively loaded. This may occur in parallel or sequentially in various embodiments.

In block 320, the second template 110 is compared to the first template 100 for changes between the two versions. The two templates may be compared at one or many different levels including activities, links, data entries, or token requirements. In block 330, a change log 150 may be created to record the changes to the business process system found during the comparison of the templates 100 and 110. In one embodiment, a change log 150 may contain all changes to the business process system including: added, removed, or modified activities, links, data entries, or token requirements. In another embodiment, the change log 150 may include only changes that affect the tokens and token requirements. In block 335, the change log may be used to predict the predicted orphan tokens that may occur during the selected business process system migration. In one embodiment, a policy generator 170 may use the change log to predict the predicted orphan tokens based on the changes recorded to token requirements. In another embodiment, the policy generator 170 may have to derive changes to the tokens based upon changes to activities, links, and data entries recorded in the change log. In another embodiment, block 335 may be combined with block 320 and the predicted orphan tokens may be recorded in the change log 150.

In block 340, the predicted orphan tokens are used to generate an orphan token policy file for managing orphan tokens found during the migration. The orphan token policy file may be created by comparing the predicted orphan tokens to a set of rules for handling orphan token types and creating orphan token policies 132 to manage their occurrence. As mentioned in a previous example, designation of importance given to activities, links, data, or token records may be used in combination with a set of token rules 175 to assist in the generation of the orphan token policy file 130.

In block 350, an optional user rule input is shown. The optional step may include the granting a user the ability to manually edit the orphan token policy file. This may be accomplished using a tool such as an XML editor or other appropriate software tool. User editing of the rules may be used when the rules applied or the designation given certain activities or tokens change or have special circumstances.

In block 360, the orphan token policy file may be used to modify a migration file 180. The migration file 180 may be used convert the business process system from a first business system to a second business system as previously discussed. For example, the modification of the migration file 180 using the orphan token policy file may be done in a process administration console, which may be part of or connected to the workflow management system 230, prior to the migration. In block 370, the migration from the first business process system template to the second business process template occurs using the modified migration file 180 and the process 300 ends at block 380.

Figure 4:
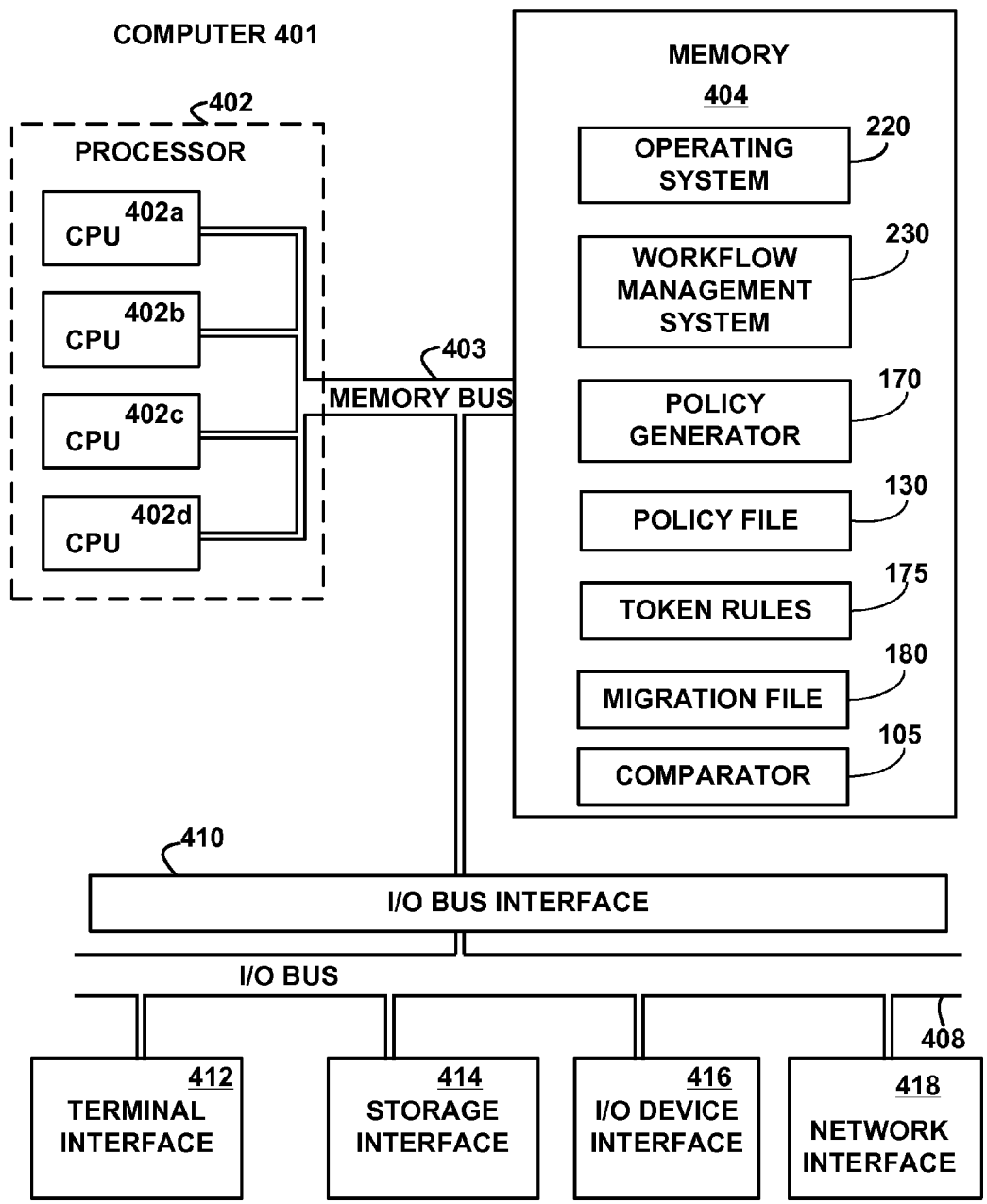
FIG. 4 depicts a high-level block diagram of an exemplary system according to an embodiment of the invention.

FIG. 4 depicts a high-level block diagram of an exemplary system for implementing an embodiment of the invention. The mechanisms and apparatus of embodiments of the present invention apply equally to any appropriate computing system. The major components of the computer system 401 comprise one or more CPUs 402, a memory 404, a terminal interface 412, a storage interface 414, an I/O (Input/Output) device interface 416, and a network interface 418, all of which are communicatively coupled, directly or indirectly, for inter-component communication via a memory bus 403, an I/O bus 408, and an I/O bus interface unit 410.

The computer system 401 contains one or more general-purpose programmable central processing units (CPUs) 402A, 402B, 402C, and 402D, herein generically referred to as the CPU 402. In an embodiment, the computer system 401 contains multiple processors typical of a relatively large system; however, in another embodiment the computer system 401 may alternatively be a single CPU system. Each CPU 402 executes instructions stored in the memory 404 and may comprise one or more levels of on-board cache.

In an embodiment, the memory 404 may comprise a random-access semiconductor memory, storage device, or storage medium (either volatile or non-volatile) for storing data and programs. In another embodiment, the memory 404 represents the entire virtual memory of the computer system 401, and may also include the virtual memory of other computer systems coupled to the computer system 401 or connected via a network. The memory 404 is conceptually a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 404 may contain elements for control and flow of memory used by the CPU 402. The memory may contain operating system 220, workflow management system 230, policy generator 170, policy file 130, token rules 175, comparator 105, and migration file 180 along with other elements discussed previously. These elements may be contained individually in the memory or in various embodiments where they are combined. In various embodiments, they may be contained in the memory at different times, added and removed as required. The illustrated elements are shown as being contained within the memory 404 in the computer system 401, in other embodiments some or all of them may be on different computer systems and may be accessed remotely, e.g., via a network.

Although the memory bus 403 is shown in FIG. 4 as a single bus structure providing a direct communication path among the CPUs 402, the memory 404, and the I/O bus interface 410, the memory bus 403 may in fact comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in fact, contain multiple I/O bus interface units 410, multiple I/O buses 408, or both. While multiple I/O interface units are shown, which separate the I/O bus 408 from various communications paths running to the various I/O devices, in other embodiments some or all of the I/O devices are connected directly to one or more system I/O buses. A process administration console may be coupled with the I/O device interface 416.

In various embodiments, the computer system 401 is a multi-user mainframe computer system, a single-user system, or a server computer or similar device that has little or no direct user interface, but receives requests from other computer systems (clients). In other embodiments, the computer system 401 is implemented as a desktop computer, portable computer, laptop or notebook computer, tablet computer, pocket computer, telephone, smart phone, or any other appropriate type of electronic device.

FIG. 4 is intended to depict the representative major components of an exemplary computer system 401. But individual components may have greater complexity than represented in FIG. 4, components other than or in addition to those shown in FIG. 4 may be present, and the number, type, and configuration of such components may vary. Several particular examples of such complexities or additional variations have been disclosed herein; these are by way of example only and are not necessarily the only such variations.

Exemplary embodiments have been described in the context of a fully functional system for creation of the orphan token policy 130 file for use in modifying the migration file 180 so that orphan tokens found during a business process system migration may be resolved. Readers of skill in the art will recognize, however, that embodiments also may include a computer program product disposed upon computer-readable storage medium or media (or machine-readable storage medium or media) for use with any suitable data processing system or storage system. The computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer or storage system having suitable programming means will be capable of executing the steps of a method disclosed herein as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the claims.

As will be appreciated by one skilled in the art, aspects may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used. The computer readable medium may be a computer-readable signal medium or a computer-readable storage medium. The computer readable signal medium or a computer readable storage medium may be a non-transitory medium in an embodiment. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire, optical fiber cable, RF, etc., or any suitable combination of the foregoing.

Computer program code for carrying out operations for aspects may be written in any combination of one or more programming languages, including an object-oriented programming language such as Java, Smalltalk, C++ or the like and conventional procedural programming languages, such as the C programming language or similar programming languages. The program code may execute entirely on the user's computer, partly on the user's computer, as a stand-alone software package, or on one module or on two or more modules of a storage system. The program code may execute partly on a user's computer or one module and partly on a remote computer or another module, or entirely on the remote computer or server or other module. In the latter scenario, the remote computer other module may be connected to the user's computer through any type of network, including a local area network (LAN) or a wide area network (WAN), or the connection may be made to an external computer (for example, through the Internet using an Internet Service Provider).

Aspects are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart, or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions or acts specified in the flowchart, or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terms "server and "mobile client" are used herein for convenience only, and in various embodiments a computer system that operates as a mobile client computer in one environment may operate as a server computer in another environment, and vice versa. The mechanisms and apparatus of embodiments of the present invention apply equally to any appropriate computing system, including a computer system that does not employ the mobile client-server model.

While this disclosure has described the details of various embodiments shown in the drawings, these details are not intended to limit the scope of the invention as claimed in the appended claims.

What is claimed is:

1. A method for managing tokens in a business process system migration, comprising:

generating, by a computer, a change log by comparing activities and links of a first business process system template to activities and links of a second business process system template prior to a migration from the first to the second template, the change log including added, removed, and modified activities and links;

predicting prior to the migration, by the computer, at least one orphan token based on the change log, wherein a token corresponds with an instance of a use of the business process system and includes an electronic marker of a location of the instance in the business process system, and an orphan token corresponds with a token that is unable to advance on a link to a next activity if the business process system is migrated to the second business process system template from the first business process system template;

generating prior to the migration, by the computer, an orphan token policy file to manage predicted orphan tokens, the orphan token policy file including an instruction for changing an activity stage of a predicted orphan token prior to the migration from the first to the second template, wherein the predicted orphan token is migrated, absent the instruction, to a first activity stage in the second template after a migration to the second template from the first template, and the instruction changes the activity stage that the predicted orphan token is migrated to in the second template to a second activity stage, wherein the first and second stages are different stages of the second template, and the second activity stage precedes the activity stage of the predicted orphan token in the first template; and modifying a migration file prior to the migration, by the computer, using the orphan token policy file, wherein the generating of a change log, the predicting of at least one orphan token, the generating of the orphan token policy file, and the modifying of a migration file are computer operations, and each operation is distinct from the other operations.

2. The method of claim 1, further comprising:

migrating the business process system to the second business process system template from the first business process system template by the computer using the migration file.

3. The method of claim 1, wherein the orphan token policy file includes an instruction for modifying data within a predicted orphan token.

4. The method of claim 1, wherein the orphan token policy file includes an instruction for deleting a predicted orphan token.

5. A non-transitory computer-readable storage medium for managing tokens in a business process system migration, the storage medium having executable code stored thereon to cause a machine to perform operations, comprising:

generating, by a computer, a change log by comparing activities and links of a first business process system template to activities and links of a second business process system template prior to a migration from the first to the second template, the change log including added, removed, and modified activities and links;

predicting prior to the migration, by the computer, at least one orphan token based on the change log, wherein a token corresponds with an instance of a use of the business process system and includes an electronic marker of a location of the instance in the business process system, and an orphan token corresponds with a token that is unable to advance on a link to a next activity if the business process system is migrated to the second business process system template from the first business process system template;

generating prior to the migration, by the computer, an orphan token policy file to manage predicted orphan tokens, the orphan token policy file including an instruction for changing an activity stage of a predicted orphan token prior to the migration from the first to the second template, wherein the predicted orphan token is migrated, absent the instruction, to a first activity stage in the second template after a migration to the template from the first template, and the instruction changes the activity stage that the predicted orphan token is migrated to in the second template to a second activity stage, wherein the first and second stages are different stages of the second template, and the second activity stage precedes the activity stage of the predicted orphan token in the first template; and modifying a migration file prior to the migration, by the computer, using the orphan token policy file, wherein the generating of a change log, the predicting of at least one orphan token, the generating of the orphan token policy file, and the modifying of a migration file are machine operations, and each operation is distinct from the other operations.

6. The computer-readable storage medium of claim 5, further comprising:

migrating the business process system to the second business process system template from the first business process system template by the computer using the migration file.

7. The computer-readable storage medium of claim 5, wherein the orphan token policy file includes an instruction for modifying data within a predicted orphan token.

8. The computer-readable storage medium of claim 5, wherein the orphan token policy file includes an instruction for deleting a predicted orphan token.

9. A workflow management system for managing tokens in a business process system, comprising:

a comparator to generate a change log for use in a business process system migration by comparing activities and links of a first business process system template to activities and links of a second business process system template prior to a migration from the first to the second template, the change log including added, removed, and modified activities and links, and to predict prior to the migration at least one orphan token based on the change log, wherein a token corresponds with an instance of a use of the business process system and includes an electronic maker of a location of the instance in the business process system, and an orphan token corresponds with a token that is unable to advance on a link to a next activity if the business process system is migrated to the second business process system template from the first business process system template, wherein the generating of a change log by the comparator is an operation that is distinct from an operation including the predicting of at least one orphan token by the comparator;

a policy generator to create, prior to the migration, an orphan token policy file to manage predicted orphan tokens, wherein an operation to create of an orphan token policy file by the policy generator is distinct from the operations of the comparator, the orphan token policy file including an instruction for changing an activity stage of a predicted orphan token prior to the migration from the first to the second template, wherein the predicted orphan token is migrated, absent the instruction, to a first activity stage in the second template after a migration to the second template from the first template, and the instruction changes the activity stage that the predicted orphan token is migrated to in the second template to a second activity stage, wherein the first and second stages are different stages of the second template, and the second activity stage precedes the activity stage of the predicted orphan token in the first template; and the workflow management system to modify a migration file to migrate the business process system to the second business process system template from the first business process system template, wherein the migration file is modifiable prior to the migration using the orphan token policy file, wherein an operation modify a migration file is distinct from the operation to create of an orphan token policy file by the policy generator and from the operations of the comparator.

10. The apparatus of claim 9, wherein the orphan token policy file includes an instruction for modifying data within a predicted orphan token.

11. The apparatus of claim 9, wherein the orphan token policy file includes an instruction for deleting a predicted orphan token.

* * * * *